Oct. 23, 1928. 1,689,048

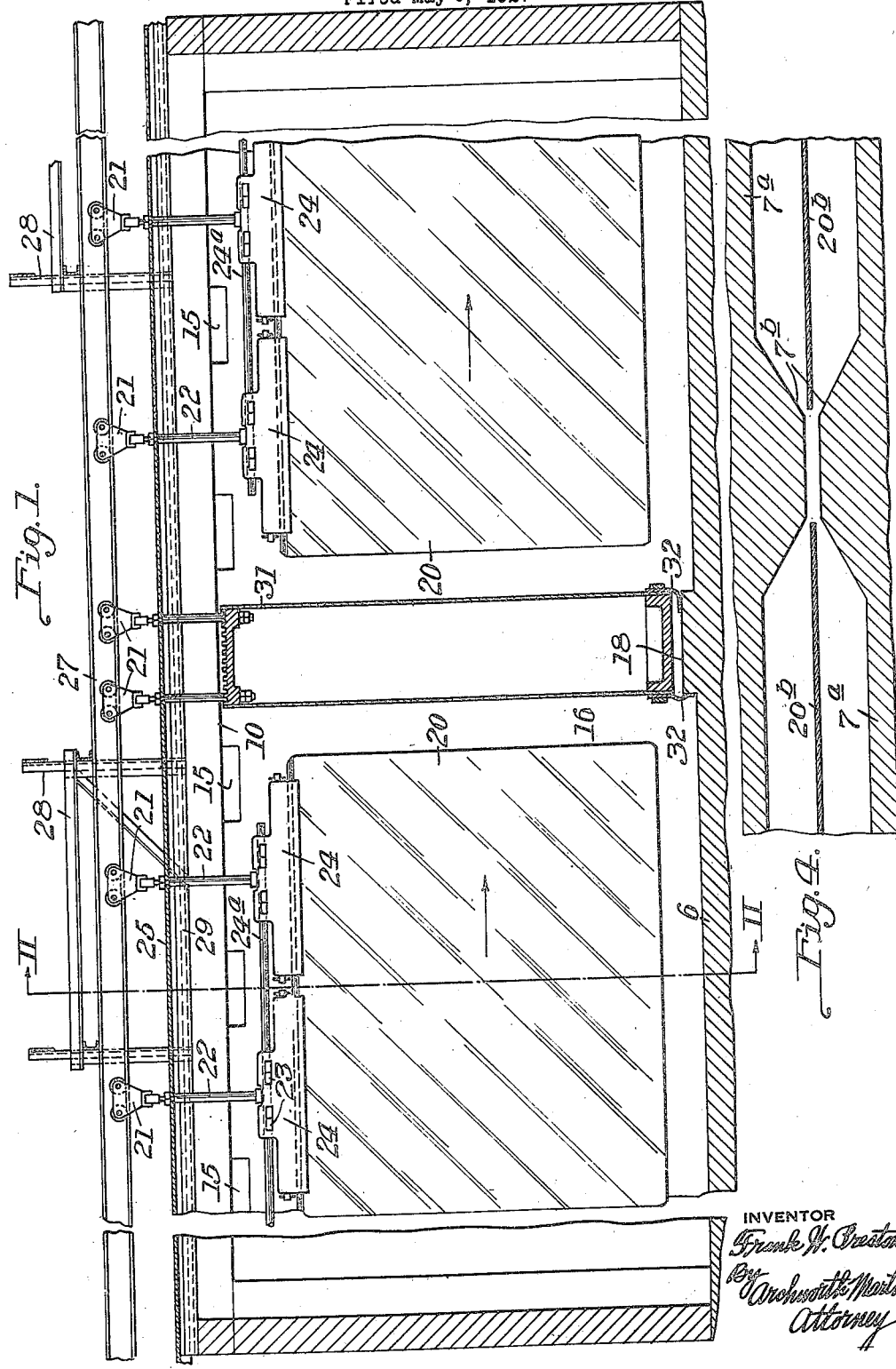

F. W. PRESTON

METHOD OF AND APPARATUS FOR ANNEALING GLASS

Filed May 5, 1927 2 Sheets-Sheet 2

INVENTOR
Frank W. Preston
By Archworth Martin,
Attorney.

Patented Oct. 23, 1928.

1,689,048

UNITED STATES PATENT OFFICE.

FRANK W. PRESTON, OF BUTLER, PENNSYLVANIA.

METHOD OF AND APPARATUS FOR ANNEALING GLASS.

Application filed May 5, 1927. Serial No. 189,095.

My invention relates to methods of and apparatus for annealing glass, and particularly to the annealing of plate and other sheet glass.

In annealing large sheets of plate glass and the like, difficulties arise that are not experienced in connection with the annealing of smaller articles such as bottles, table ware, etc. In the case of the large sheets, there is frequently such non-uniformity of temperature as between various portions of the sheets while being annealed that strains are set up therein which result in breakage, both during the annealing operation and when the glass is put into service. An ideal condition would be that wherein all portions of a plate, at a given stage in the annealing process, would be of the same temperature, but such condition is not essential, if the temperature conditions are such that the isotherms at various portions of the sheet are in parallel straight lines or at least lie upon a developable surface.

By the usual methods, wherein the sheets are annealed while disposed in a horizontal plane, deformation frequently occurs through sagging of the sheet, in case the temperature within the lehr becomes too hot or in cases where there is unevenness in the lehr floor.

One object of my invention is to effect a more uniform temperature condition as between various portions of large glass articles such as sheets, while undergoing heat treatment.

Another object of my invention is to provide an improved manner of supporting sheets and passing them through a lehr.

Still another object of my invention is to simplify and improve generally the art of annealing glass.

Figure 3:
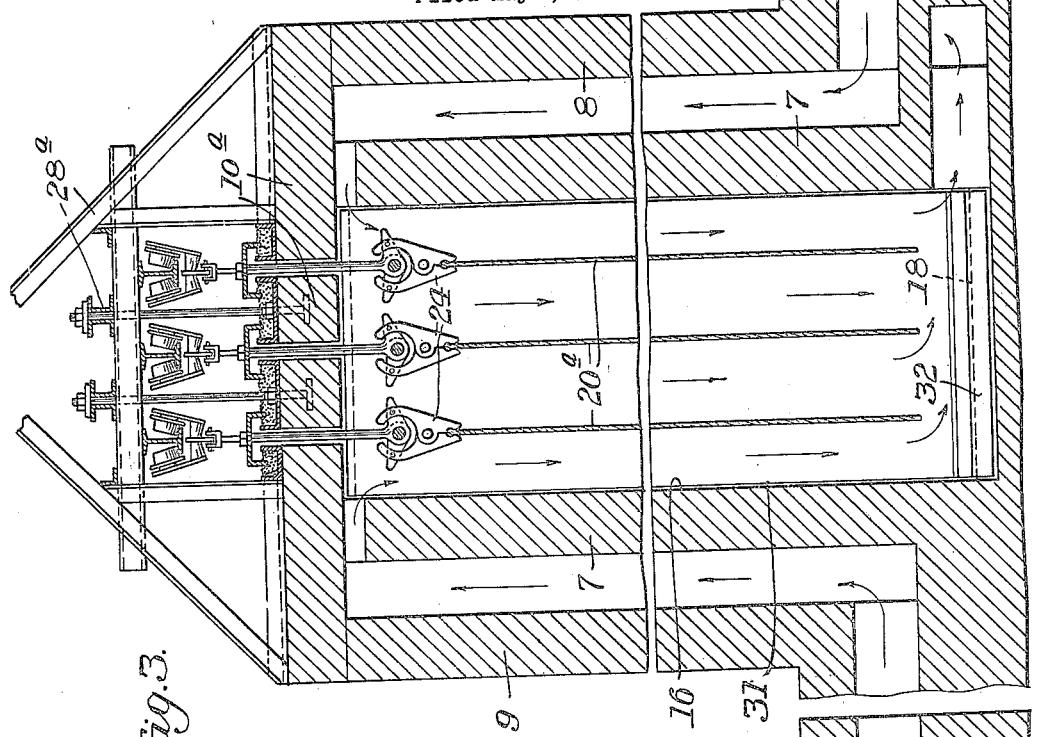
Figure 2:
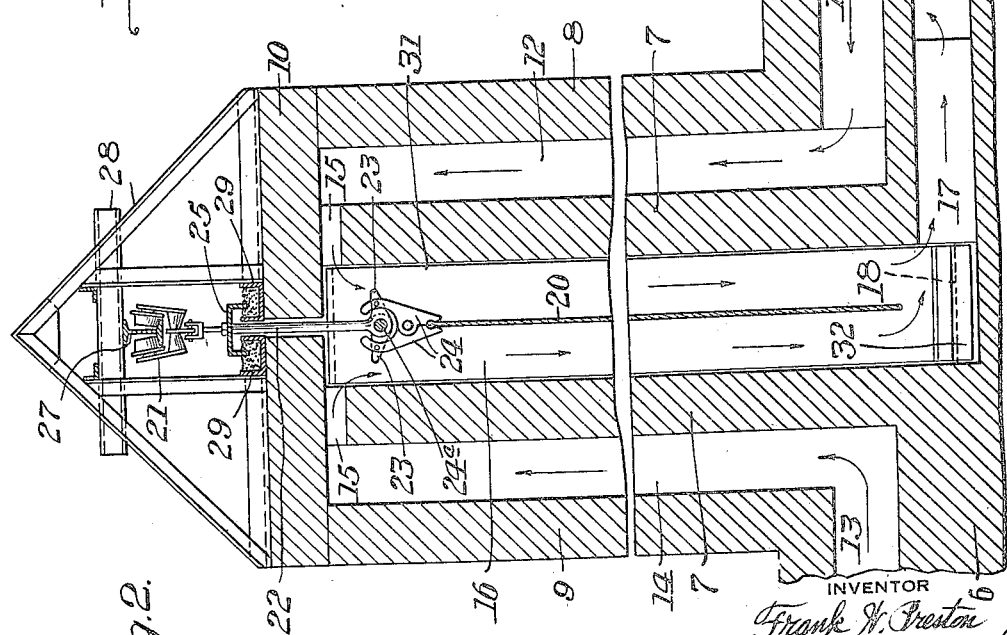

Some of the forms of apparatus by which my invention may be practised are shown in the accompanying drawing, wherein Figure 1 is a longitudinal sectional view of one form of heat-treating apparatus; Fig. 2 is a view taken on the line II—II of Fig. 1; Fig. 3 is a view similar to Fig. 2, but showing a modified arrangement of sheet-conveying apparatus, and Fig. 4 is a sectional plan view of a modification of the apparatus shown in Figs. 1 and 2.

The lehr is constructed of any suitable material which tends to confine and prevent radiation of heat, and is composed of a bottom wall 6, inner walls 7, outer walls 8 and 9, and a top wall 10. A series of conduits 11 are disposed along the side walls of the lehr and afford communication between the space 12 that is intermediate the walls 7 and 8 and a source of heated air (not shown). Conduits 13 are similarly arranged at the other side of the lehr to afford communication between a source of heated air and the space 14 between the walls 7 and 9. A series of passages 15 are provided at the upper ends of the walls 7 so that air may flow from the spaces 12 and 14 to the lehr chamber 16, or from such chamber 16 to the spaces 12 and 14, depending upon whether the heated air is being directed to the lehr chamber, to supply heat to the glass sheets or whether the sheets are being permitted to cool and air currents caused to flow in directions opposite to those indicated by the arrows. At its lower end, the lehr chamber has communication with passages 17 that may lead to a stack (not shown).

The lehr chamber 16 is provided at longitudinally spaced points with a series of sills 18, for a purpose to be hereinafter described. Passages 11, 12, 13, 14, 15 and 17 are preferably provided at points intermediate adjacent sills 18.

Sheets of glass 20 are suspended within the lehr chamber by means of carriages 21. Each carriage has a tong-supporting rod 22 that has connection with the inner ends of toggle links 23 which in turn pivotally support tongs 24 that may be faced with asbestos pads and which grasp the sheets of glass 20. The weight of the glass upon the tongs tends to hold the toggle links 23 and the upper ends of the tongs 24 in expanded position. As shown in the drawing, the sheets 20 have beads formed on their upper edges in order to permit of a more secure engagement by the tongs, but it will be understood that various other forms of sheet supporting devices could be employed. Adjacent pairs of tongs 24 are preferably held in alinement by a rod 24ª that is sufficiently loose to prevent movement of one pair of tongs relative to another, in a direction longitudinally of the lehr, through expansion and contraction resulting from temperature changes.

Each pair of rods 22 extends through and supports a channel iron 25. An I-beam 27 serves as a track for the wheels of the carriages 21, and the beam 27 is supported upon a frame-work or truss 28 that rests upon the top wall 10 of the lehr. The top wall 10 is slotted throughout its length or made in two parts, to permit movement of the suspending rods 22, as the carriages travel along the track 27. Channels 29 are provided and contain granular material such as silocel or other heat-resisting material into which the flanges of the channels 25 extend, so that a seal is provided against flow of heated air from the lehr.

Between each of two sheets 20, as shown in Fig. 1, I provide a travelling bulk head 31 that is suspended from carriages similar to those employed for carrying the sheets. These bulk heads are preferably hollow and may be filled with suitable heat-resisting material. The bulk heads 31 are of such width that they approximately fill the space between the lehr walls 7, only sufficient clearance being provided to permit free movement of the bulk head as it travels from one end of the lehr to the other. The bulk heads are provided with asbestos or other flaps 32 that engage the sills 18, so that while the sheets of glass and the bulk heads are at the positions shown in Fig. 1, each sheet 20 will be, in effect, in a separate chamber and can be subjected to a desired temperature condition independently of the temperature of the other sheet.

As shown in Fig. 3, I may support a plurality of sheets 20$^a$ within the lehr chamber in side-by-side relation and in tandem, instead of having a single row in tandem as shown in Figs. 1 and 2. In this arrangement, the air passages, the sheet-supporting members and the bulk heads are substantially the same as in the other forms above described. The blocks forming the top wall 10$^a$ of the lehr are supported by the side walls and from frame-work 28$^a$.

In Fig. 4, I show an arrangement whereby the bulk heads may be omitted. In lieu of the bulk heads 31, I show the lehr walls 7$^a$ contracted at various points so as to approximate the chamber effect resulting from the employment of the bulk heads. In use, the sheets 20$^b$ are advanced through the lehr and permitted to pause between the compartments formed by partially blocking off the lehr tunnel as at 7$^b$.

In the practice of my method, the sheets to be annealed are brought to a vertical position by the use of a tilting table or otherwise, and grasped by the tongs 24, whereupon they are pushed into the lehr, the bulk heads being interspersed between alternate sheets. The sheets will preferably be advanced through the lehr intermittently and permitted to pause for a desired period of time at various stations within the lehr, such as those between two sills 18 or the restricted portions 7$^b$. In those stations which are adjacent to the entry end of the lehr, heat will usually be supplied through the conduits 11 and 13, such heat flowing in the direction shown by the arrows and exhausting through the conduits 17. In some cases, it may be unnecessary to supply heat to the lehr chamber, by reason of the heat present in the sheet itself.

As the sheets approach the exit end of the lehr, they will ordinarily be subjected to a cooling action, in which case the heat radiating from the sheets will flow upwardly within the lehr chamber 16 and through the passages 15, 12 and 14, in directions the reverse of that indicated by the arrows.

Not only do I provide for an effective control of temperature, but it will be seen that instead of the sheets tending to become deformed within the lehr, vertical suspension thereof will have the effect of causing them to straighten, in case they enter the lehr slightly deformed, because at temperatures of approximately 1150 degrees F., for instance, depending upon the composition of the glass, the sheets will be sufficiently plastic that bends therein will become straightened, but not sufficiently plastic to permit them to stretch unduly by reason of their own weight.

I claim as my invention:

1. The method of annealing sheet glass, which comprises supporting the glass in a vertical plane and directing a current of heated air downwardly against one surface thereof.

2. The method of annealing sheet glass, which comprises supporting the glass in a vertical plane and directing currents of heated air downwardly against both surfaces thereof.

3. The method of annealing sheet glass, which comprises supporting the glass in a vertical plane and directing a current of air against one surface thereof in a vertical direction.

4. The method of annealing sheet glass, which comprises passing a plurality of sheets of glass through a lehr in tandem relation, preventing flow of air past the space between adjacent edges of said sheets, and subjecting each sheet to different temperature conditions.

5. The method of treating sheet glass which comprises suspending the glass from its upper edge in a vertical plane, and causing air to flow in contact with one surface of the glass.

6. Apparatus for annealing sheet glass, comprising carriers for supporting a plurality of sheets of glass, and a bulk head supported between the sheets of glass and movable with the said carriers.

7. Apparatus for annealing glassware, comprising a lehr tunnel, a plurality of carriers for advancing the glass through said tunnels in tandem relation, and means for restricting movement of air from the zone occupied by one unit of glass to the zone occupied by another unit of glass, the said means being movable with the carriers.

In testimony whereof I, the said FRANK W. PRESTON, have hereunto set my hand.

FRANK W. PRESTON.